Dec. 31, 1968  D. L. LAFUZE  3,419,785
POWER FACTOR SENSITIVE CURRENT LIMIT
Filed Jan. 16, 1967  Sheet 5 of 5

INVENTOR.
DAVID L. LAFUZE
BY
HIS ATTORNEY

United States Patent Office 3,419,785
Patented Dec. 31, 1968

3,419,785
POWER FACTOR SENSITIVE CURRENT LIMIT
David L. Lafuze, Waynesboro, Va., assignor to General Electric Company, a corporation of New York
Filed Jan. 16, 1967, Ser. No. 609,405
30 Claims. (Cl. 321—11)

ABSTRACT OF THE DISCLOSURE

The invention is a current limit circuit which may be used to protect a cycloconverter or a phase controlled rectifier system operating in the invert mode. The current limit provides protection whenever the system's power source current so lags power source voltage that the firing angle of the phase controlled rectifiers becomes retarded to the point that successful commutation is uncertain. The current limit utilizes a firing wave to mark the beginning of the region of potential commutation failure, the firing wave forming one input to and AND gate, power source current forming the other input. Whenever the current overlaps the firing wave in time, the AND gate turns on, normal system regulation is overcome and the firing angle of the triggering signals to the phase controlled rectifiers is advanced.

---

This invention relates to a current limit circuit. More particularly, this invention relates to a current limit circuit that is sensitive to load current power factor and is suited for use in a phase controlled rectifier or cycloconverter system.

The current limit circuit of the present invention was developed for use with a cycloconverter system such as described in copending application Ser. No. 559,031, filed May 25, 1966, by Lawrence R. Peaslee. Application Ser. No. 559,031 is a reissue application of U.S. Patent 3,152,297 and assigned to the same assignee as the present application. A cycloconverter converts AC power at one frequency or a varying frequency to AC power at another frequency or selected frequencies. Such a frequency conversion system includes a power source which may be a generator producing a voltage output having a frequency proportional to the speed of a mechanical drive such as the engine of an aircraft. The generator supplies its power to a load through a number of controlled switching devices which are gated into conduction in accordance with a reference signal to produce the desired output frequency.

In the past, the current limit for such a cycloconverter system simply limited the generator current to prevent system failure during overload or fault conditions. Such a method works well in a fault condition but is less satisfactory during an overload condition such as, for example, when a motor in the load circuit of the cycloconverter is suddenly started. In such a circumstance, the load current power factor is very low and the cycloconverter tries to transfer power later and later in the generator cycle. Because of this, the time that remains to turn off the conducting switching devices in the converter circuit before the line-to-line voltage from the generator reverses is at a minimum. If the current limit is of the type that is permanently set to prevent failure of the switching device at such times of low power factor load current, the capacity of the cycloconverter to deliver power is greatly lessened for all normal power factor loads.

It is accordingly an object of the present invention to provide a current limit circuit which has a limit that is automatically adjusted for various load power factors.

Another object of the present invention is to provide a current limit circuit that protects against commutation failure.

Another object of the present invention is to provide a current limit circuit for a cycloconverter that is governed by the point in each cycle of generator voltage which marks the beginning of the region of potential turn off failure of conducting ones of the converter switching devices.

A further object of the present invention is to provide a current limit circuit for a cycloconverter that reduces the amplitude of the reference signal to reduce converter output at the onset of an overload.

Another object of the present invention is to provide a current limit circuit for a cycloconverter that increases generator output to maintain converter output during an overload condition.

A further object of the present invention is to provide a current limit circuit for a cycloconverter that has the current limit adjusted to the amplitude of the cycloconverter generator voltage.

In phase controlled rectifier systems operating in the invert mode, i.e., where the power flow is from the DC load to the AC power source, for example, where an inductive load is shut down, the same problem of commutation failure is present. Commutation or the turning off of the switching device in a phase controlled rectifier system must be accomplished early enough in the line-to-line cycle to insure that the power source inductance is discharged prior to voltage reversal. During operation in the invert mode, satisfactory commutation is placed in jeopardy due to the converter's attempt to switch later in the half cycle to permit more power to flow from the load to the source. Here again, a current limit circuit that senses load current power factor is necessary to prevent commutation failure while providing maximum power transfer during normal power factor conditions.

It is accordingly another object of the present invention to provide a current limit circuit to protect a phase controlled rectifier system operating in the invert mode.

Another object of the present invention is to provide a current limit circuit for a phase controlled rectifier system that has its current limit adjusted to power source voltage amplitude.

A further object of the present invention is to provide a current limit circuit for a phase controlled rectifier system that advances the firing angle of the controlled rectifier to limit power transfer when commutation of the controlled rectifier is in jeopardy.

The example of the invention described in this application is a current limit circuit for use with a cycloconverter or phase controlled rectifier in which power source current is sensed and compared with a firing wave which is synchronized with power source voltage and positioned in phase to mark the beginning of the region of potential commutation failure of the converter switching devices so that whenever the power source current overlaps the firing wave in time, the power transfer of the converter system is limited by the signal generated by the current limit. This initial protective action taken at the onset of an overload when the lagging and large amplitude power source current overlaps the firing wave is sensed in a switching element which acts in the nature of an AND gate, the output of which is coupled to the system voltage regulator so that when the output of the AND gate circuit exceeds a predetermined amplitude, the voltage regulator is controlled by the output signal from the current limit circuit and the system becomes current regulated. The output from the AND gate is also coupled to the system power source to increase the voltage of the power source in response to the current limit signal.

Thus both immediate system protection is provided and the system power output is maintained by the increase of power source voltage to provide the necessary power to accommodate the overload or fault condition.

Other objects and advantages of the invention may be more fully appreciated and understood from a detailed examination of the example of the invention shown in the drawings, in which.

Figure 1:
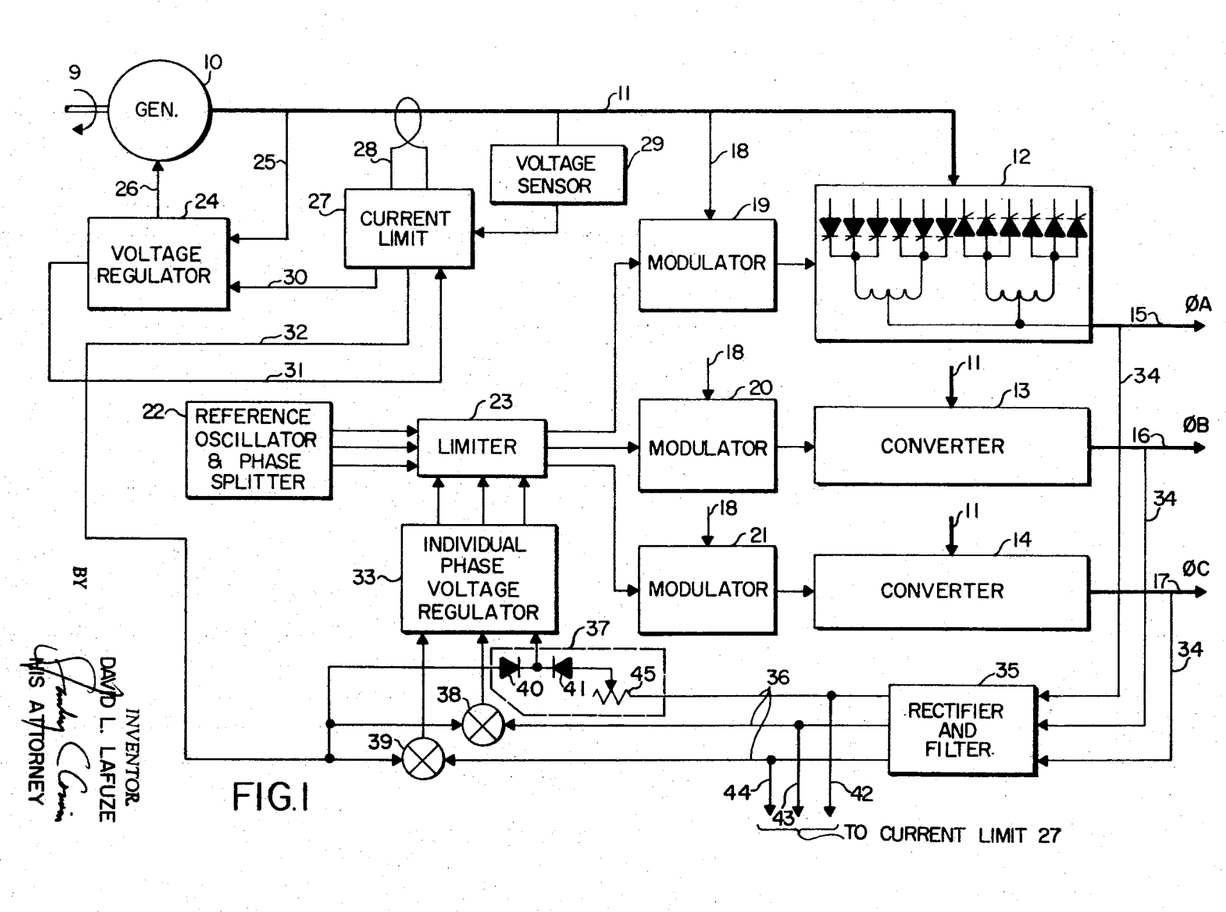
FIGURE 1 is a block diagram of a cycloconverter system including a current limit circuit according to the invention.

Referring now to the drawings wherein like reference numerals refer to like parts throughout, there is shown in FIGURE 1, a cycloconverter system including the current limit circuit of this invention shown in proper operative relationship. FIGURE 1 is a block diagram purporting to show only the relationship of the various elements of the cycloconverter system to the current limit circuit. A more detailed description of a cycloconverter for which the current limit circuit may be utilized is set forth in the aforementioned application Ser. No. 559,031.

FIGURE 1 shows a power source in the form of a generator 10 being driven by mechanical means such as the shaft 9 which may be coupled, for example, to the engine of an airplane. The output of generator 10 is conveyed to converters 12, 13 and 14 via power line 11. The cycloconverter shown in FIGURE 1 is a six phase input to three phase output system, the six phase generator being denoted by the number of silicon controlled rectifiers, the switching devices shown in the converter 12 (hereinafter referred to as SCR's). Six SCR's are oriented to conduct during the positive half cycles of generator output and six SCR's are oriented to conduct during the negative half cycles of generator output. The outputs of the SCR's in each converter stage are combined and filtered to produce the various phase outputs at conductors 15, 16 and 17 and noted as $\phi A$, $\phi B$ and $\phi C$. The conduction periods of each SCR in a converter stage is controlled by a modulator gating circuit for each converter stage. Modulator 19 is coupled to converter stage 12 and modulators 20 and 21 provide firing signals for the converter stages 13 and 14. Conductor 18 supplies a portion of the generator output voltage to each of the modulator 19, 20 and 21. The firing signals for each of the SCR's in a converter stage are positioned in time as a function of a reference signal which is derived from a reference oscillator and phase splitter shown at block 22. The amplitude of this reference signal is controlled by a limiter 23 which couples the reference signal to each of the modulators. A voltage regulator 33, coupled to each of the system phase outputs 15, 16 and 17 by conductors 34, a rectifier and filter circuit 35, conductors 36 and voltage takeover circuits 37, 38 and 39, provides the control function for controlling the limiter 23, thereby regulating and balancing the amplitude of the different phase output voltages. Feedback for each converter stage, not shown, may also serve as an input to the modulator for each stage. As will be explained more fully hereinafter, the combination of the portion of the generator output voltage with the reference signal in the modulator produces the firing signals for the silicon controlled rectifier switching devices in each of the converter stages.

Figure 6:
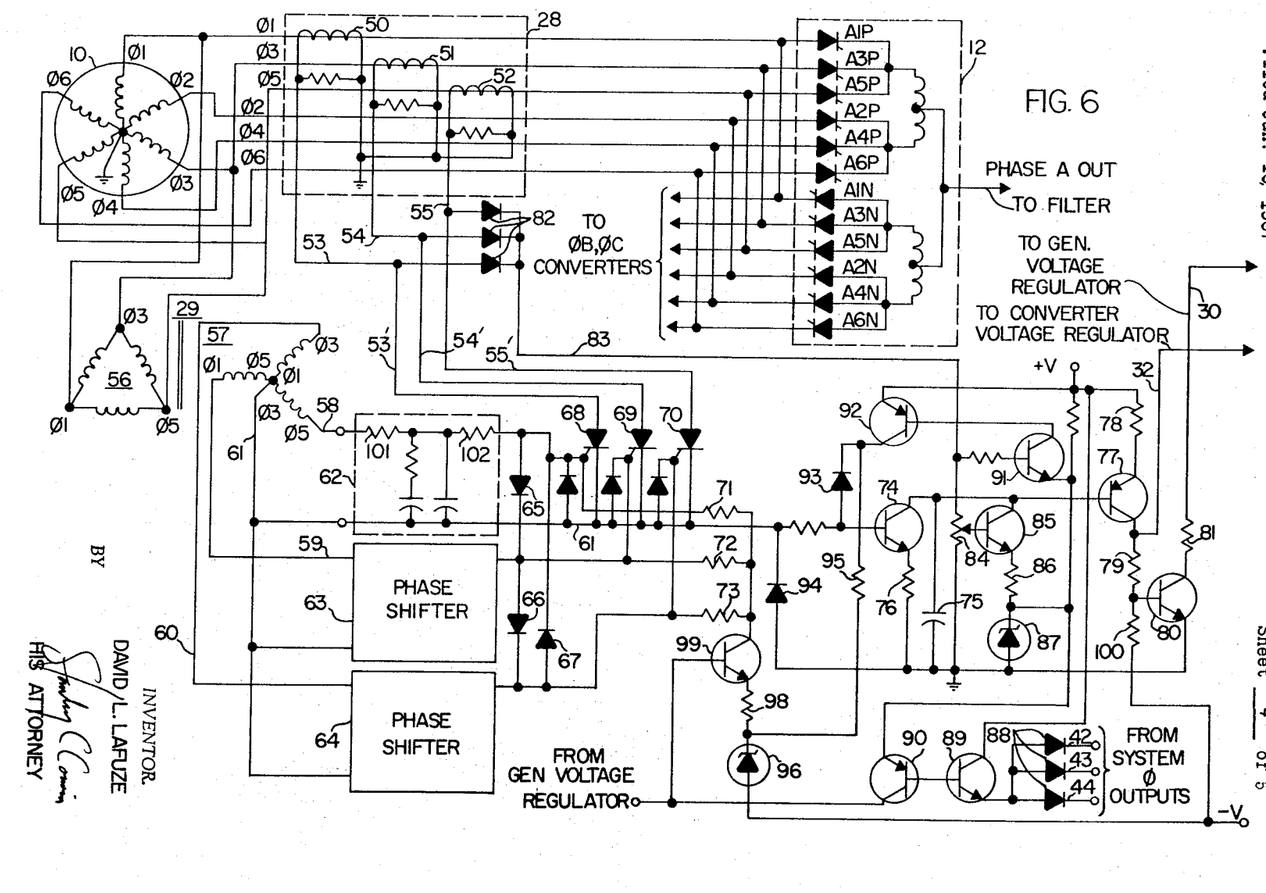
FIGURE 6 is a part schematic and part block diagram of a current limit circuit according to the present invention.

Also shown in FIGURE 1 is a current limit circuit 27 which is coupled to sense generator current by means 28 and is synchronized with generator voltage by voltage sensor means 29. The output of the current limit is coupled by lead 32 to voltage takeover circuits 37, 38 and 39, which are discriminator means coupling the larger voltage of the output from the current limit or the portion of a system phase output, such as the portion of phase A output determined by potentiometer 45, to the voltage regulator 33. As is shown in schematic detail in FIGURE 1, the discriminator or voltage takeover circuits 37, 38 and 39 may consist of a pair of diodes 40 and 41, one coupled to the output from the current limit and one coupled to one system phase output. The larger voltage of these two output signals back biases the diode coupled to the other output to permit only the larger voltage to be coupled to the voltage regulator. It thus can be seen that when the output of the current limit exceeds a preselected portion of the system phase output, voltage regulator 33 becomes current controlled and the cycloconverter system is current regulated.

Conductor 30 applies the output of the current limit 27 to a second voltage regulator 24 which is coupled to the generator 10. Voltage regulator 24 is coupled to the output of the generator 10 via line 25 and serves to control the output of this generator by controlling the excitation to the generator via line 26. Voltage regulator 24 is also coupled back to the current limit circuit via conductor 31 so that the current limit is adjusted in accordance with generator voltage.

FIGURE 1 also shows conductors 42, 43 and 44 which serve to couple a rectified and filtered portion of the system output per rectifier and filter circuit 35, back to current limit circuit 27. This connection is shown again in FIGURE 6 and will be discussed more fully in connection with this figure below.

Figure 2:
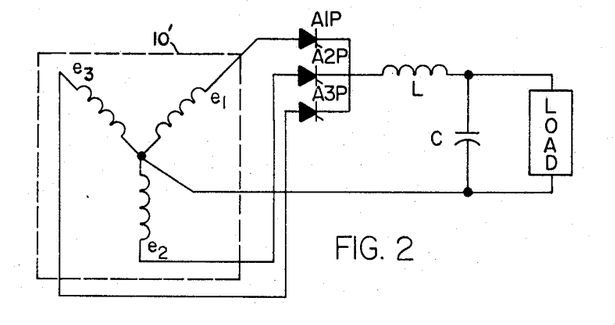
FIGURE 2 is a schematic diagram of a phase controlled rectifier system.

For a better understanding of the need for a current limit for a cycloconverter which is sensitive to load factor, it is necessary to understand the fundamentals of a cycloconverter. For this purpose, reference is made to FIGURE 2 and 3. FIGURE 2 shows a simple phase controlled rectifier circuit including a three phase generator 10', which is the equivalent of the generator 10 shown in FIGURE 1 except that for ease of illustration, a three phase output was selected. The phase one output of generator 10' designated $e_1$ is coupled to the load by SCR A1P. Likewise, generator outputs $e_2$ and $e_3$ are coupled to the load by SCR's A2P and A3P, where A stands for the phase A output of the system, the number succeeding the A stands for the generator phase to which the switch is connected and the P designates that the switching device is responsive to positive generator voltage. The generator output is coupled to the load by each of the SCR's through a filter comprised of an inductor L and a capacitor C. Assumptions are made with regard to the circuit shown in FIGURE 2 for the sake of simplicity. These assumptions are as follows:

(1) The generator 10' is a stiff (zero impedance) source of three phase power with sinusoidal waveshape.

(2) The SCR's are perfect switches, i.e., they turn on instantly when gated to zero forward voltage drop and carry no reverse current.

(3) Inductor L and capacitor C are sufficiently large so that the voltage across the load is a smooth direct voltage.

(4) The load is a back electromotive force load of magnitude equal to the average direct voltage from the phase controlled rectifier.

Figure 3:
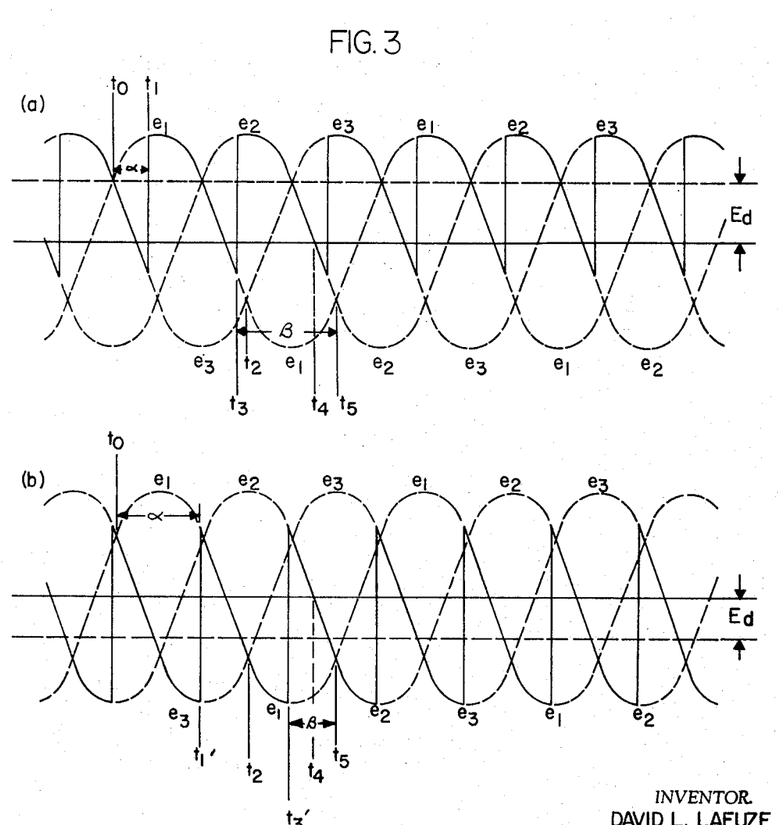
FIGURE 3 shows power source waveforms useful in understanding the operation of the phase controlled rectifier system shown in FIGURE 2 and the operation of the current limit circuit of the present invention.

The operation of the phase controlled rectifier circuit of FIGURE 2 is best understood from a consideration of FIGURE 3. This figure portrays a composite waveform consisting of three sine waves $e_1$, $e_2$, and $e_3$ representing the output of the generator 10′. These generator voltage sine waves are shown in dotted lines and the portion of the generator voltage conducted by the SCR's A1P, A2P and A3P is shown in solid lines. The figure shows that each SCR is turned on at the same point in a cycle of generator voltage. If SCR A3P is conducting, the SCR A1P can be turned on any time that the voltage $e_1$ is more positive than the voltage $e_3$. This period begins at time $t_0$ and ends at time $t_2$ as shown in the figure. In other words, SCR A1P can be turned on whenever the line-to-line voltage across this SCR is positive. The angle $\alpha$ is the phase angle at which the SCR is fired. The firing point is also noted in the figure as occurring at $t_1$. In FIGURE 3a, $\alpha$ is equal approximately to 50 degrees measured from zero degrees at $t_0$. It is noted that for a firing angle of 50 degrees, there is an average positive voltage output $E_d$ from the phase controlled rectifier.

FIGURE 3b illustrates a negative average output voltage $E_d$ for a firing angle of 118 degrees. Thus, it is seen that a maximum positive average voltage output is obtained when each SCR is switched on as early as possible in the cycle such as at time $t_0$ when $\alpha$ is zero degrees. When the SCR's are fired at $\alpha$ equal to 90 degrees, the average voltage output is zero, and when each SCR is switched on at the last possible point in each cycle such as at time $t_2$, a maximum negative voltage output is obtained. If the SCR's A1P, A2P and A3P are fired at a varying phase angle, the average voltage output from the phase controlled rectifier would vary at a rate controlled by the rate at which the firing angle of the SCR's is advanced or retarded.

Figure 4:
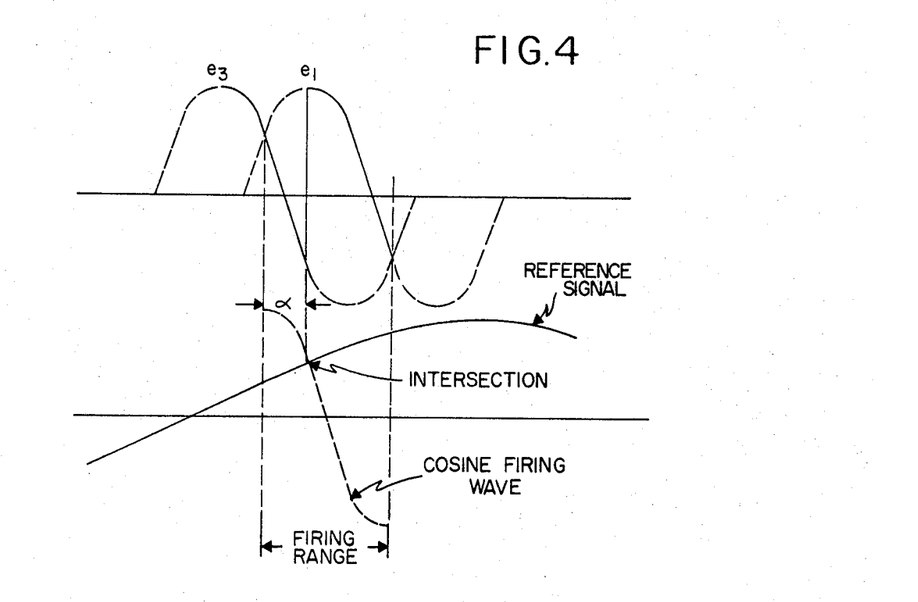
FIGURE 4 shows voltage waveforms useful in understanding cycloconverter operation.

FIGURE 4 illustrates how the reference signal from oscillator 22 in FIGURE 1 is combined with the generator output in the modulators 19, 20, and 21 to obtain a cyclical varying of the advancing and retarding of the firing angles of the SCR's shown in FIGURE 2. The portion of the generator output that is coupled to these modulators is inverted from a sine wave to a cosine wave for each phase of the generator output. When this cosine wave intersects the reference signal, which is shown to be lower in frequency than the generator output, the modulator produces a firing pulse to trigger an SCR such as A1P into conduction.

It can be seen from FIGURE 4 that as the amplitude of the reference signal increases or decreases, the point of intersection with the cosine wave advances or is retarded. This is important to note for two reasons. The first relates to the basic operation of the cycloconverter, which is that during one cycle of the reference signal there is a continuing change of amplitude so that the firing angle advances and retards at the same rate as the reference signal. Since the average voltage passed by the SCR's varies with the position of the firing angle, it can be seen that the cycloconverter output frequency is the frequency of the reference signal.

Secondly, as the amplitude of the reference signal is decreased, the firing angle advancing and retarding about the 90-degree, i.e., the zero output voltage point, is accordingly decreased. With decreased reference signal amplitude, the SCR's thus no longer produce as large an average voltage output and the amplitude of the cycloconverter output is reduced. This phenomenon is utilized by the current limit circuit to protect the cycloconverter during overload and fault conditions, as will be explained further below.

Figure 5:
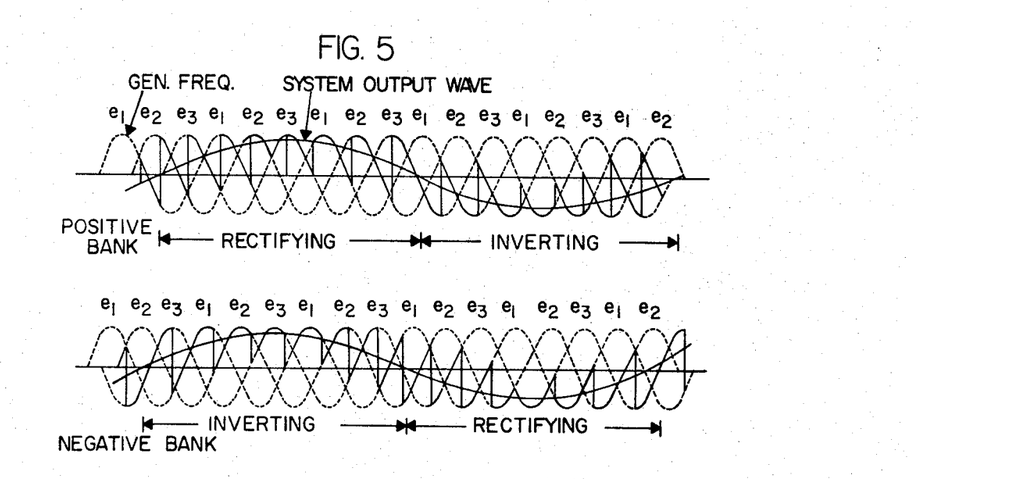
FIGURE 5 shows a composite waveform of a single phase cycloconverter output.

FIGURE 5 shows in solid line the resulting output from the phase controlled rectifiers of FIGURE 2 when the SCR's are fired at different firing angles as controlled by an alternating voltage such as the reference signal from the oscillator 22 of FIGURE 1. Since a cycloconverter produces an AC output, another bank of SCR's responsive to the negative half cycles of generator output is coupled to the positive bank shown in FIGURE 2 to complete the frequency converter. FIGURE 5 also shows the output voltage wave for the negative bank.

It is noted from FIGURES 3 and 5 that when the firing angle for the positve bank of SCR's (the phase controlled rectifier circuit shown in FIGURE 2) is retarded beyond 90 degrees, the average voltage output of the bank is negative. This period of time is shown as an inverting operation in FIGURE 5. A phase controlled rectifier is said to be inverting when the power transfer is from the load to the source. It is also noted that the negative bank of SCR's is inverting when the positive bank is rectifying.

Referring now again to FIGURE 3, it has been shown that the SCR A1P can be turned on at any time from $t_0$, where the line-to-line voltage across this SCR becomes positive, to the point $t_2$ where the line-to-line voltage reverses. Once the SCR A1P has been turned on, it can be turned off at any time before the generator voltage $e_1$ becomes more positive than the generator voltage $e_2$ at $t_5$. This is because the SCR A1P is commutated by the switching on of the SCR A2P, and SCR A2P can be last turned on at the point $t_5$ where $e_2$ is no longer more positive than $e_1$. A turn-off or commutation phase angle $\beta$ is shown measured from this time $t_5$ which, to repeat, is the last time at which SCR A1P can be turned off. The commutation angle $\beta$ for the condition where the firing angle $\alpha$ is 50 degrees, as shown in FIGURE 3a, extends between the points $t_5$ and $t_3$, where $t_3$ marks the angle at which SCR A1P is actually turned off.

In an overload condition, or when there is a fault placed across the output lines of the cycloconverter, the normal reaction of this machine is to attempt to maintain the output voltage by increasing the reference signal. This increase in reference signal advances the time at which nonconducting ones of the SCR's will be turned on when the machine is rectifying and retards the turn-on time when the machine is inverting. This causes a problem since the turn-on of one SCR commutates the last conducting SCR by causing a reverse voltage to be impressed thereacross. If the generator supplying each of the SCR's has no inductance, the time that it would take to commutate a conducting SCR is limited only by the short time that it takes an SCR to resume its blocking characteristic. The power source for a cycloconverter or phase controlled rectifier system, however, does represent a substantial inductance in series with each of the SCR's, as is shown by the symbolic representation of the generator in FIGURES 2 and 6. Thus in the invert mode of operation where the switching devices are turned on (and therefore other switching devices turned off) late in the generator cycle, there are far less volt-seconds available to discharge the energy that has been stored in the generator inductance associated with the last conducting SCR. For example, with reference to FIGURE 3, if SCR A1P is conducting and SCR A2P is turned on at time $t_4$ instead of time $t_3$, the energy that can be discharged from the inductance of $e_1$ between $t_4$ and $t_5$ is far less than was available when the attempted commutation was at point $t_3$. The energy that was stored in the $e_1$ inductance during the conduction period of SCR A1P must be exhausted if this SCR is to be turned off. If SCR A1P is still conducting when voltage $e_1$ becomes more positive than $e_2$ (after point $t_5$), SCR A1P will continue to conduct and will attempt to turn off SCR A2P instead of the commutation sequence desired. Thus, due to the energy already stored by the inductance of phase 1 of the generator and the failure to discharge this inductance, the continued conduction of SCR A1P will result in excessively high currents being drawn from the generator.

For any given generator, the inductance for each phase can be determined. Knowing the turn-off time required for the SCR's, the maximum current which must be commutated successfully and the amplitude of the voltage generated by the generator, it is possible to determine the time it takes with the voltage available to discharge the generator inductances. It is therefore only a matter of simple calculation to determine the last safe point for turning off a conducting one of the SCR's in each phase controlled rectifying bank in the cycloconverter. Knowing this last safe commutation point, a current limit circuit was devised, as described below, that marks a point in time which immediately precedes the last safe commutation point and is designated the beginning of the region of potential commutation failure. The current limit circuit of the present invention is activated only when the power source current of a cycloconverter or phase controlled rectifier so lags power source voltage that the converter switching devices are switched in this region of potential commutation failure.

The recognition that the commutation process requires a given amount of time is not new. In the past, however, the protection that was provided was to simply limit the maximum amplitude of the reference signal so that the output current could not exceed an amplitude which would result in a $\beta$ angle smaller than can be tolerated for successful commutation. In other words, the worst load condition fixed the maximum amplitude of the reference signal for all load conditions. The maximum output that could be delivered by the system was therefore limited for favorable load conditions when the system was capable of delivering greater power.

To alleviate this overburdening protective feature of past current limits, a current limit was devised that is automatically activated only at the beginning of the region of potential commutation failure so that during all other more favorable load conditions, the reference signal is capable of achieving maximum amplitude to produce rated system output. Such a current limit circuit is shown in FIGURE 6.

FIGURE 6 shows a current limit circuit according to the invention in operative relationship with portions of a cycloconverter including a generator 10 coupled to converter stage 12 for developing the phase A output of the system. Generator 10 is a six phase generator symbolized by the six inductances marking the phase outputs 1 through 6. These phase outputs are coupled to the SCR's in the converter stage 12 in a staggered order with the SCR's being fired as designated by the numbers 1 in A1P and 2 in A2P, etc., which designate the particular SCR's. The generator output leads are also shown being connected to the converters for phase B and phase C in this example of a six phase input, three phase output cycloconverter. FIGURE 6 shows current transformers 50, 51 and 52 monitoring the current of every other phase of the generator 10. The currents developed by the current transformers 50, 51 and 52 are individually coupled to the respective switching elements 68, 69 and 70 by leads 53, 54, 55 and 53', 54' and 55'.

It is submitted that the current monitoring scheme shown in FIGURE 6 is only one of many possible combinations for monitoring the generator current. For example, each phase of the generator current could be monitored. Or, sensing elements could be placed to monitor the current directly into given SCR's such as all the SCR's in the positive bank, or all the SCR's in the negative bank, or, indeed, all of the SCR's could have the current which they conduct monitored. Some of these other possibilities of current sensing combinations and their attendant advantages and disadvantages will be discussed further in connection with FIGURE 8.

The voltage output of the generator is also monitored by a voltage sensor in the form of a transformer 29 having three phase delta-connected primary windings 56 and Y-connected secondary windings 57. The outputs of the secondary windings are connected to phase shift circuits 62, 63 and 64, shown schematically in block 62. The phases monitored by the voltage sensor, while being shown as phases 1, 3 and 5 of the generator, do not necessarily have to correspond to the phases monitored by the current sensors. The voltage sensor is utilized only to obtain a firing wave that is of the proper phase displacement for the currents sensed by the current sensors. To see this more clearly, the points in the primary 56 which are coupled to the phase 1, 3 and 5 outputs of the generator have been so labeled. It is noted that the line-to-line voltage between phase 1 and phase 5, as labeled in the secondary circuit 57, is coupled to the phase shifter 63 by lead 59, the phase shifter 63 being coupled to the switch 69 which in turn receives the current monitored in phase 3 of the generator. Likewise, the line-to-line voltage between phase 1 and phase 3 is coupled to phase shift circuit 64, which in turn is coupled to switch 70, the receiver of the output of the phase 5 generator current sensor. Thus, it can be seen that there is a preliminary phase shift occasioned by transformer 29 in addition to the phase shift provided by circuits 62, 63 and 64. It is therefore necessary only to point out that the voltage sensing transformer 29 and phase shift circuit 62, 63 and 64 together form a firing wave generating circuit which must be capable of producing a firing wave positioned appropriately for the corresponding current sensor regardless of the generator phase being sensed by the current sensors. Sensing the voltage output of the generator, while being a preferred means of synchronizing the firing wave generating circuits with the generator, is only one of many different synchronizing links.

The outputs of the phase shift circuits 62, 63 and 64 are coupled to the control electrodes of the switch devices 68, 69 and 70 by a pulse width limiting circuit comprised of diodes 65, 66 and 67. This pulse width limiting circuit serves to limit the duration of the firing wave so that it is present only when conducting SCR's in the converter stages are to be turned off and does not extend into that period when these SCR's are again to be turned on. The diodes 65, 66 and 67 intercouple the outputs of the phase shift circuits to subtract the firing wave of one phase from the firing wave of another phase. In this manner, the unwanted portion of each phase may be subtracted out.

The switches 68, 69 and 70, which receive both the firing waves and the outputs from the current sensors, are shown as SCR's, although any sensitive gated switch device or even a pair of diodes with proper amplification could be substituted. The function of each switch device is that of an AND gate where the firing wave serves as one input and the current from one of the current transformers serves as the other input. The firing wave coupled to the control electrode of the SCR enables this device so that upon the presence of a current signal at the anode of this switch conduction occurs.

The firing of any one or all of the switches 68, 69, 70 is sensed by a second switch means, the transistor 74, which has its base lead coupled to the common output lead 61 of the switches. As transistor 74 is turned on in response to current flow into its base, the normally charged capacitor 75 discharges therethrough at a rate determined by the amount of current into the base of transistor 74 and the size of the emitter resistor 76. The discharging of capacitor 75 lowers the voltage at the base of the transistor 77 to turn on this transistor. Transistor 77 is coupled at its emitter to a source of positive voltage via resistor 78 and to a source of negative voltage at its collector via resistors 79 and 100. The rate of discharge of capacitor 75 controls the amount of current conducted by transistor 77, which in turn determines the magnitude of the voltage developed across resistors 79 and 100 which is the output voltage coupled by lead 32 to the voltage takeover circuits 37, 38 and 39 and the voltage regulator 33 as shown in FIGURE 1.

Figure 7:
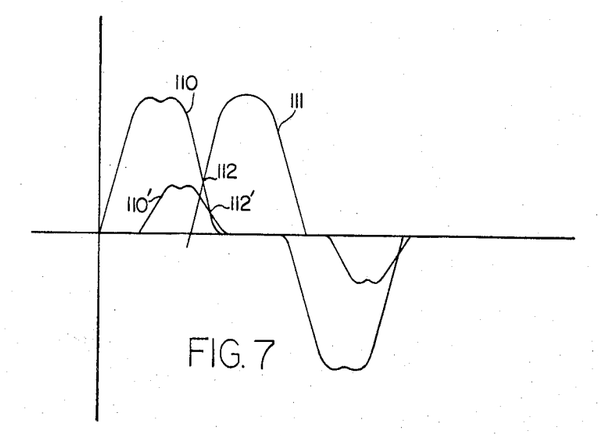
FIGURE 7 shows the firing wave generated by the current limit circuit shown in FIGURE 6 and generator current waveform to facilitate understanding of the operation of the current limit circuit.

FIGURE 7 may now be referred to for a more complete picture of the relationship between generator current and the firing wave generated by the current limit circuit. FIGURE 7 shows a firing wave 111 positioned in time such that the leading edge thereof marks the beginning of the region of potential turn-off failure of conducting ones of the SCR's in the converter stages. Also shown is one phase of the generator current 110 which is of sufficient amplitude and lags in time sufficiently to overlap the firing wave 111 at the point 112. This overlap portion of the two curves determines the volt-seconds that is delivered to the base of transistor 74 to control the duration and amount of conduction for this switch device.

It should be pointed out that for either leading or lagging cycloconverter load current, the generator current appears to be lagging. This is because a cycloconverter as well as any phase controlled rectifier system is a phase retard system. It should be also noted that the generator current can be slightly lagging and very large, or more lagging and smaller in amplitude, as shown by curve 110'. In both cases, the current waves intersect the firing wave by substantially the same amount and the current limit circuit provides the same protection.

With these considerations in mind, FIGURES 6 and 7 can again be examined. A firing wave such as 111, shown in FIGURE 7 is applied to the control electrode of the switches 68, 69 and 70. When the cycloconverter system becomes so heavily loaded that the generator current overlaps the leading edge of the firing wave, one or more of the switches 68, 69 and 70 is forward biased and conducts causing transistor 74 to turn on. Capacitor 75 discharges and transistor 77 is turned on to produce a voltage output on line 32. If this voltage exceeds the portion of the cycloconverter phase output with which it is compared in the voltage takeover circuit 37, for example, the individual phase voltage regulator 33 becomes current controlled and the reference signal to the modulators 19, 20 and/or 21 is lowered by the limiter circuit 23 as shown in FIGURE 1.

The lowering of the reference signal takes place immediately for fast cycloconverter protection from commutation failure. However, if the effect of the current limit was only to reduce the system output, then overloads such as the starting of a motor would not be supplied sufficiently high voltage to minimize motor starting time. Therefore, in addition to lowering the reference signal via lead 32, transistor 80, coupled at its base to the collector of transistor 77, turns on at the same time transistor 77 turns on to supply an output to the generator voltage regulator 24 via line 30 as shown in FIGURE 1. When transistor 80 is conducting, the output therefrom causes voltage regulator 24 to increase the generator output. This increase in generator voltage provides the additional energy necessary to maintain the cycloconverter system output at the desired level without risking commutation failure.

Since the current limit circuit increases the generator voltage as well as reducing the reference signal, another advantage is obtained. As can be observed from FIGURE 3, an increase in generator voltage output provides more voltage within the period that had been selected as the last safe commutation period as denoted by the angle $\beta$ to discharge the generator inductance. With more volts of the volt-seconds product available to discharge the generator inductance, the commutation time can be reduced which in effect means the firing wave 111 shown in FIGURE 7 can be retarded while still maintaining the same measure of protection against commutation failure. In other words, by increasing generator voltage, the system can tolerate greater loads and the current limit can be set higher.

This adjustment of the current limit in proportion to the generator voltage is accomplished by the current limit control transistor 99. This transistor is coupled at its base to the generator voltage regulator 24 via the lead 31. The collector of transistor 99 is coupled to each of the phase shift means 62, 63 and 64 by the resistors 71, 72 and 73. The emitter of transistor 99 is coupled to a negative voltage via resistor 98 and Zener diode 96. As the generator voltage increases, transistor 99 is proportionally turned on to draw direct current from the phase shift circuits thereby retarding the firing wave from each circuit. The current path is through resistors 71, 72, 73, transistor 99, resistor 98, Zener diode 96, the negative supply and diode 94 to common conductor 61. This mode of current limit control, it will be understood, is possible only if the firing wave from each of the phase shift circuits is supplied from a current source. The resistors 101 and 102, denoted within phase shift circuit 62, therefore, are large resistors to effect a current output from this and each of these circuits.

It should be noted that the conduction of transistor 74 results in the turning on of both transistors 77 and 80. While the condition of transistor 80 results in an increase of generator voltage, it is only when the output voltage on line 32 from transistor 77 exceeds a predetermined portion of the system phase output voltage, as determined by voltage takeover circuits 37, 38 and 39, that the reference signal is lowered. Thus, with only slight overloads, it is possible that the output of transistor 77 is not sufficient to overcome the only slightly reduced system output voltage and the current limit circuit only acts to raise the generator voltage. As has been described above, this increase in generator voltage acts to increase the current limit.

If the current monitored by current transformers 50, 51 and 52 was the current into the SCR which is about to be turned off and the firing wave was phase displaced to keep this particular SCR from turning off too late in the generator line-to-line voltage cycle, the current limit of the present invention would be complete as described at this point. However, the positioning of current transformers 50, 51 and 52 is such that these sensing devices sense the combined currents into both positive and negative banks of SCR's in each of the converter stages. Since a combined current is sensed, the firing wave must be set to meet the worst load condition for the combined current sensed. This compromise is a practical one, however, since a minimum number of current sensors are needed to obtain sufficient current sensing coverage. Yet, there are two load conditions when this type of sensing provides unnecessary protection. The first condition is at no load where the converter current is the filter capacitor current. This very low power factor leading load condition is seen at the generator as a very low power factor lagging load due to the phase shift of the system with respect to leading loads.

The second condition is in the case of a line-to-line fault. When the cycloconverter is subject to a line-to-line fault such as a short circuit, the short appears to one line to be leading while it may be lagging to the other. Again, because of the phase retarding occasioned by the converter system, the sum of the currents sensed by the current sensors 50, 51 and 52 is a composite current that is more lagging than the current to any individual phase SCR's. Here again, the protection is far greater than would be needed if the current experienced by each SCR were to be monitored.

A current limit inhibit means is utilized to prevent the current limit from reacting to a no-load condition. This inhibit circuit includes diode 93 which clamps the base of transistor 74 to a negative voltage as fixed by resistor 95 and the Zener diode 76 coupled to the negative voltage supply. This voltage clamp prevents transistor 74 from responding to the conduction of switches 68, 69 and 70. The current limit inhibit means further includes a switch coupled to diode 93 to remove the voltage clamp whenever generator current is greater than a predetermined level, such as half rated current. Transistors 91 and 92 make up this switch. Transistor 91 has its base coupled to line 83 which carries a current proportional to combined phase generator output current. The line 83 is coupled to current sensors 50, 51 and 52 by diodes 82 which serve to combine the current monitored in each of the phases 1, 3 and 5 of the generator 10. The current flowing through line 83 develops a voltage across potentiometer 84 which is sufficient to turn on transistor 91 when this voltage exceeds the reference voltage maintained at the emitter of transistor 91 by Zener diode 87. When transistor 91 turns on, the voltage at the base of transistor 92, coupled to the collector of transistor 91, is brought down turning this transistor on to couple a positive voltage to the cathode of diode 93 thereby removing the voltage clamp from the base of transistor 74. By selecting Zener diode 87 and potentiometer 84 such that a voltage representing half generator current will turn transistor 91 on, it can be seen that diode 93 in conjunction with transistors 91 and 92 forms a current limit inhibit circuit preventing the current limit circuit from operating until generator current has reached half rated current, thus avoiding current limit circuit reaction at no-load conditions.

A line-to-line fault correction circuit is shown in FIGURE 6 to include an OR gate made up of diodes 88 connected to the system phase by leads 42, 43 and 44, and leads 36, rectifier and filter circuit 35, and leads 34 as shown in FIGURE 1. Whenever a line-to-line fault causes one or more of the system phase outputs to drop below a predetermined minimum, the OR gate responds and transistors 89 and 90 are turned on. Transistor 89 is coupled at its emitter to the OR circuit diodes 88. The collector of this transistor is coupled to the positive voltage supply and its base is coupled to the base of transistor 90. Transistor 90 has its emitter coupled to the positive voltage source while its collector is coupled directly to the base of transistor 99. When transistors 89 and 90 turn on in response to any one of the system phase outputs dropping below a predetermined minimum, a positive voltage is applied to the base of transistor 99 turning this transistor on full to greatly phase retard the firing waves from the phase shifting circuits 62, 63 and 64. Thus, for all practical purposes, the $\beta$ angle sensitive current limit circuit is turned off during line-to-line fault conditions.

During a line-to-line fault condition, however, current limit is provided by a supplemental current limit circuit. This supplemental circuit includes the transistor 85 which is shown coupled at its base to the wiper arm of potentiometer 84. It will be remembered that potentiometer 84 is coupled through conductor 83 and diodes 82 to sense generator current. Since only a small portion of the voltage that is proportional to generator current developed across potentiometer 84 is coupled to the base of transistor 85, it is only when the generator current becomes excessive that the voltage at the base will be sufficient to overcome the voltage at the emitter of transistor 85 as determined by Zener diode 87. When transistor 85 turns on, the base of transistor 77 is pulled down by the collector of the transistor 85 coupled thereto and transistor 77 conducts to develop a voltage across resistors 79 and 100 appearing on output line 32. When transistor 77 is turned on, transistor 80 is also turned on and the generator voltage regulator 24 receives a signal via line 30.

Figure 8:
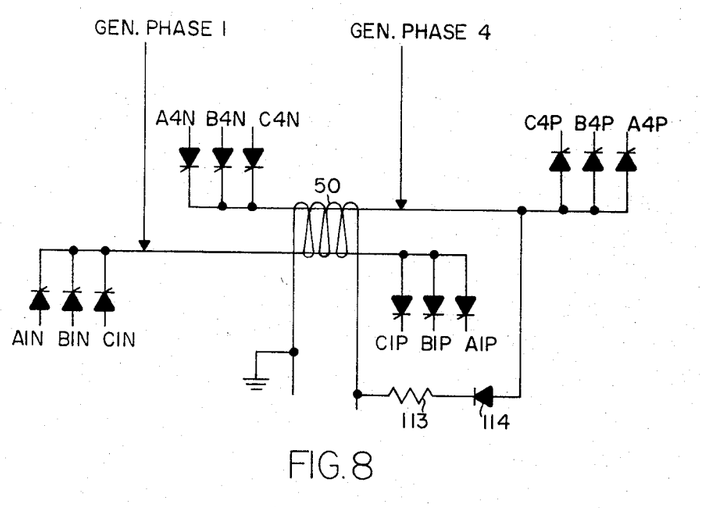
FIGURE 8 shows alternative modes of sensing generator current.

Turning now to FIGURE 8, there is shown two different alternative current sensing schemes. FIGURE 8 shows current transformer 50 coupled to sense the positive current from generator phase 1 which is the current conducted by SCR's A1P, B1P and C1P. Since current is only flowing in one direction through the current transformer 50, a reset connection is provided by diode 114 and resistor 113 coupled to a source of negative voltage such as the negative phase 1 bank of rectifiers, or in some cases to the positive rectifier bank of generator phase 4 as shown. Current transformers 51 and 52 could appropriately be coupled to sense the positive current flow to the SCR's in each converter stage that is responsive to the phase 3 and phase 5 generator currents. Since only positive current flow is sensed, only the worst commutation angle condition for the SCR's within the group sensed determines the current limit. This is quite different from sensing the entire current from a generator phase output where both the current to positive voltage responsive SCR's and negative voltage responsive SCR's are combined. In this case, the negative current power factors and the positive current power factors of the current monitored by current sensors placed at the generator are combined. Thus, by placing the current sensors so that only positive or negative current is sensed and not both, the current sensed is lagging no more than the most lagging system phase current. Therefore, the current sensing connection shown in FIGURE 8 provides a true indication of the phase angle of the load current and the added protection of the inhibit circuit for the no-load condition and the line-to-line fault protection circuit including the supplemental current limit circuit is not needed.

It should be noted that there are advantages to both the current sensing scheme shown in FIGURE 6 and that shown in FIGURE 8. When generator current is sensed, as shown in FIGURE 6, three current sensors provide an adequate sampling rate but no load and line-to-line fault correction is needed. The scheme shown in FIGURE 8 eliminates these correction circuits but since only positive or negative current is sensed by each sensor, six current sensors are required to obtain the same sampling rate.

FIGURE 8 also shows that the current transformer 50 can monitor the current to negative voltage responsive SCR's A4N, B4N and C4N of generator phase 4 which in the six phase generator system being described is 180 degrees out of phase with the generator phase 1 voltage. By being the mirror image of phase 1, negative current flow from generator phase 4 is in phase with the positive current flow of generator phase 1. Thus where the number of generator phase outputs is appropriate, FIGURE 8 shows that a single current sensing device can monitor current flow of one direction for a selected phase output and current flow of the opposite direction to the SCR's associated with the generator phase output that is the mirror image of the selected phase output. In this instance where one current sensor can monitor selected current flow of two phase outputs of the generator, high sampling rate is obtained without the need for additional correction circuits and this monitoring scheme is to be preferred.

The $\beta$ angle or power factor sensitive current limit that has been described is particularly adapted to be used with the cycloconverter system shown. However, it should be realized that under certain load conditions, the $\beta$ angle current limit may be used with any phase controlled rectifier system operating in the invert mode. Whenever the load for a phase controlled rectifier system wants to supply power to the generator at a rate that is greater than the generator inductance will allow, the generator inductance will not be discharged during each cycle and commutation failure will occur. This is the situation for which the current limit circuit of the present invention is suited.

It has been pointed out throughout the specification that the particular cycloconverter used with the current limit circuit may take a variety of shapes and forms. While a six phase to three phase system was referred to, this was only by way of illustration. Current sensing devices of various types can be utilized to monitor the current delivered to each of the switching devices and the connection may take a variety of forms. The circuit shown in FIGURE 6 represents but one way to achieve $\beta$ angle current limit. When used with a cycloconverter generator that has the appropriate number of phases, it is possible to develop a firing wave for one generator phase by merely applying another generator phase output directly to the AND gate switching devices such as switches 68, 69 and 70.

It should be noted that there is built-in stability in the charge-discharge cycle of capacitor 75 which is the element forming the heart of the conduction-nonconduction period of the current limit circuit. Since the current limit circuit output immediately lowers the system output and then more slowly raises the power source voltage, system stability depends upon a proper conduction-nonconduction cycle of the current limit. Thus, capacitor 75 is quickly discharged through a low resistor 76 coupled to the emitter of transistor 74 thereby turning on transistor 77.

When the system output is lowered and generator current no longer overlaps the firing wave so that switches 68, 69 and 70 turn off thereby turning off transistor 74, the capacitor 75 is charged through the high resistor 78 which provides the long time constant necessary to gradually turn off transistor 77 as the charge builds up on capacitor 75. This short-time-discharge and long-time-charge cycle of capacitor 75 permits the system to stabilize at the adjusted generator voltage and reference signal amplitudes.

It thus can be realized that the essence of this invention is the provision of a current limit circuit for a cycloconverter or phase controlled rectifier which is flexible by being sensitive to and adjusted by load current power factor, load current amplitude and generator voltage amplitude. It is intended that the foregoing description of one mode of carrying out this invention be not construed to limit the spirit or scope of this invention which is intended to be restricted only by the scope of the appended claims.

What is claimed and desired to be secured by Letters Patent of the United States is:

1. In a phase controlled rectifier system having a power source coupled to a load through a controlled rectifier in which control is maintained by phase angle adjust means controlling the firing angle of said controlled rectifier, a current limit circuit for protecting said system during operation in the invert mode comprising a firing wave generating circut coupled to said power source for developing a firing wave positioned in time so that the leading edge thereof marks the beginning of the region of potential commutation failure for said controlled rectifier, switch means coupled to said firing wave generating circuit to be enabled by said firing wave, means coupling a portion of the power source current to said switch means so that said switch means is triggered on to conduct said current for the period of time which the power source current overlaps said firing wave, and coupling means coupling said switch means to said phase angle adjust means to advance the firing angle of said controlled rectifier during the period of conduction of said switch means.

2. The arrangement recited in claim 1 further including current limit control means responsive to the voltage level of said power source and coupled to said firing wave generating circuit to proportionally delay said firing wave as said power source voltage increases.

3. In a phase controlled rectifier system having a power source coupled to a load through controlled rectifier means in which power transfer is controlled by phase angle adjust means coupled to said controlled rectifier to control the firing angle thereof, a current limit circuit for protecting said system during operation in the invert mode comprising a firing wave generating circuit coupled to said power source for developing a firing wave positioned in time so that the leading edge thereof marks the beginning of the region of potential failure to turn off said controlled rectifier means, switch means coupled to said firing wave generating circuit to be enabled by said firing wave, means coupling a portion of the power source current to said switch means so that said switch means is triggered on to conduct said current for the period of time which the power source current overlaps said firing wave, and coupling means coupling said switch means to said power source to increase the voltage output of said power source when said switch means is turned on.

4. The arrangement recited in claim 3 wherein the output of said switch means is proportional to the amount said power source current overlaps said firing wave and said coupling means also couples said switch means to said phase angle adjust means to advance the firing angle of said controlled rectifier means when the output of said switch means exceeds a preselected amplitude.

5. In a phase controlled rectifier system having a power source coupled to a load through controlled rectifier means in which power transfer is controlled by phase angle adjust means coupled to said controlled rectifier means to control the firing angle thereof, a current limit circuit for protecting said system during operation in the invert mode comprising a firing wave generating circuit coupled to said power source for developing a firing wave positioned in time so that the leading edge thereof marks the beginning of the region of potential failure to turn off said controlled rectifier means, two input AND gate means having one input responsive to said firing wave and the second input coupled to said power source and responsive to power source current, said AND gate means being gated on whenever the power source current overlaps said firing wave in time, voltage developing means coupled to said AND gate means to develop a voltage in proportion to the amount said power source current overlaps said firing wave, and coupling means coupling said voltage developing means to said phase angle adjust means when the developed voltage exceeds a preselected amplitude to advance the firing angle of said controlled rectifier means.

6. The arrangement recited in claim 5 wherein said power source is a multiphase power source, said controlled rectifier means is a number of silicon controlled rectifiers, at least one silicon controlled rectifier being coupled to each phase output of said power source, said firing wave generating circuit includes voltage sensing means coupled to selected phase outputs of said power source to derive a voltage proportional to the voltage output of said power source, a number of phase shift means equal to the number of power source phases sensed by said voltage sensing means, each phase shift means being responsive to the voltage derived by said voltage sensing means to develop one phase of said firing wave, and wherein said AND gate means comprises a controlled switch for each phase shift means, each controlled switch being triggered on by the presence of both the firing wave from the associated phase shift means and current from the corresponding phase output of said power source.

7. The arrangement recited in claim 5 further including a first voltage regulator coupled to said load and to said phase angle adjust means to control the position of said firing angle in accordance with the amplitude of the voltage applied to said load, said coupling means including said first voltage regulator coupled to said voltage developing means.

8. The arrangement recited in claim 7 wherein said coupling means further includes discriminating means responsive to a preselected portion of the output voltage delivered to said load and to the voltage developed by said voltage developing means to couple the larger of these two voltages to said first voltage regulator, whereby when the power source current sufficiently overlaps said firing wave so that said developed voltage exceeds the preselected portion of the output voltage, the regulation of said phase controlled rectifier system becomes current controlled.

9. The arrangement recited in claim 8 wherein said voltage developing means is a switch that is gated on by the output of said AND gate.

10. The arrangement recited in claim 9 further including a second voltage regulator coupled to said power source for controlling the voltage thereof and means coupling the output of said switch to said second voltage regulator to adjust the regulation of said power source so that the voltage generated by said power source is increased when said switch is turned on.

11. The arrangement recited in claim 10 further including current limit control means responsive to the voltage level of said power source and coupled to said firing wave generating circuit to proportionally delay said firing wave as said power source voltage increases.

12. In a frequency converter for converting the frequency of a power source to a selected frequency power output of the type including a number of frequency conversion means each comprising power switching devices responsive to the output of said power source and rendered conductive when forward biased by the output of said power source and upon the application of switching signals thereto, a reference frequency source, a gating circuit for each frequency conversion means responsive to the output from said power source and the reference signal from said reference frequency source to produce said switching signals, each gating circuit producing said switching signals at a rate equal to the frequency of said power source, each switching signal being positioned in time within a cycle of said power source frequency according to the amplitude of said reference frequency signal, and means coupled to each frequency conversion means to combine the outputs of the switching devices therein to produce a number of balanced phase outputs equal to the number of frequency conversion means and having the selected frequency of said reference frequency source; a current limit circuit for limiting the current of said frequency converter as a function of the converter load power factor comprising current sensing means to sense and derive a current proportional to the power source current applied to said frequency conversion means, a firing wave generating circuit coupled to said power source to produce a firing wave positioned in time so that the leading edge of the firing wave marks the beginning of the region of potential failure to turn off conducting ones of said power switching devices, first switch means coupled to receive said firing wave and the current derived by said current sensing means, said first switch means being turned on by said firing wave when forward biased by said current, second switch means coupled to said first switch means and rendered conductive whenever said first switch means is turned on, and coupling means coupling said second switch means to the reference frequency source of said converter when the output of said second switch means exceeds a preselected amplitude to lower the amplitude of said reference signal.

13. The arrangement recited in claim 12 wherein said current sensing means are current transformers each coupled to a selected phase output of said power source.

14. The arrangement recited in claim 12 wherein said current sensing means are current transformers each coupled to a selected phase output of said power source to sense current of one polarity.

15. The arrangement recited in claim 12 wherein said power source has a given number of phase outputs such that each phase output has another phase output that is its mirror image, and wherein said current sensing means are current transformers each coupled to a selected phase output of said power source to sense current of one polarity and to the phase output that is the mirror image of said selected phase output to sense current of the opposite polarity.

16. The arrangement recited in claim 12 further including inhibit means coupled to said power source and to said first switch means to prevent said second switch means from responding to the turning on of said first switch means whenever the current from said power source is below a predetermined magnitude.

17. The arrangement recited in claim 16 wherein said inhibit means includes a diode coupled to said first switch means to clamp the output voltage of said first switch means to an electrical common, a voltage reference, voltage developing means coupled to said power source for developing a voltage proportional to power source current, and third switch means coupled to said diode, said voltage reference and said voltage developing means, said third switch means being triggered on by the voltage from said voltage developing means when it exceeds said voltage reference to remove the voltage clamp from said first switch means.

18. The arrangement recited in claim 12 wherein said power source is a multiphase source, and wherein said firing wave generating circuit includes voltage sensing means coupled to appropriately selected phase outputs of said power source to derive a voltage proportional to the voltage output of said power source, a number of phase shift means equal to the number of power source phases sensed by said voltage sensing means, each phase shift means being responsive to the voltage derived by said voltage sensing means to develop each phase of said firing wave.

19. The arrangement recited in claim 18 wherein said current sensing means comprises a number of current sensors coupled to selected phase outputs of said power source, said voltage sensing means comprises a number of voltage sensors, one for each current sensor, each voltage sensor coupled to an appropriate phase output of said voltage source to develop a firing wave in conjunction with the phase shift means coupled thereto that is positioned in time to mark the beginning of said region of potential turn-off failure for the current output of the corresponding current sensor.

20. The arrangement recited in claim 19 wherein said first switch means comprises a switch for each phase shift means, each switch being coupled to receive the firing wave from the associated phase shift means and the current output of the corresponding current sensor, said second switch means being coupled to each switch of said first switch means.

21. The arrangement recited in claim 12 wherein said frequency converter further includes a first voltage regulator coupled to each output phase of said frequency converter and to said reference frequency source for controlling the amplitude of said reference signal, thereby controlling the magnitude of the voltage output of said frequency converter, and wherein said coupling means includes said first voltage regulator coupled to said second switch means.

22. The arrangement recited in claim 21 further including a second voltage regulator coupled to said power source for controlling the voltage thereof and means coupling the output of said second switch means to said second voltage regulator to adjust the regulation of said power source so that the voltage generated by said power source is increased when said second switch means is turned on.

23. The arrangement recited in claim 21 wherein said coupling means further includes a takeover circuit for each phase output of said frequency converter, each takeover circuit coupling the larger voltage of the outputs of said second switch means and a preselected portion of one phase output voltage of said frequency converter to said first voltage regulator, whereby when the output of said second switch means exceeds the preselected portion of one phase output, the regulation of said frequency converter becomes current controlled.

24. The arrangement recited in claim 23 wherein said second switch means includes a first switch, a capacitor coupled across said first switch and a second switch coupled to said capacitor, the rate of discharge of said capacitor through said first switch, when said first switch is turned on by the output from said first switch means, controlling the amount of current flowing through second switch and the voltage output of said second switch means.

25. The arrangement recited in claim 23 further including a pulse width limiting circuit coupled to said firing wave generating circuit to terminate said firing wave before said conducting ones of said power switching devices can be turned on again.

26. The arrangement recited in claim 25 wherein said firing wave generating circuit includes voltage sensing means coupled to said power source to derive a voltage proportional to the voltage output of said power source and a number of phase shift means equal to the number of power source phases sensed by said voltage sensing means, each phase shift means being responsive to the voltage derived by said voltage sensing means to develop said firing wave, and wherein said pulse width limiting circuit intercouples the phase displaced outputs of said phase shift means to subtract one from the other to thereby limit the duration of each phase of the firing wave.

27. The arrangement recited in claim 18 further including current limit control means coupled to said power source to sense the voltage output thereof and coupled to each phase shift means to proportionally retard the firing wave as said power source voltage increases.

28. The arrangement recited in claim 27 wherein each phase shift means contains a high impedance so that said firing wave is a current wave, and wherein said current limit control means includes a transistor having its base coupled to said power source and its collector-emitter path coupled to each phase shift means to draw a direct current therefrom in proportion to the amplitude of the power source voltage.

29. The arrangement recited in claim 27 further including a fault correction circuit coupled to each phase output of said frequency converter and to said current limit control means, said fault correction circuit being activated whenever the voltage of any phase output falls below a predetermined value to cause said current limit control means to retard the firing wave from said phase shift means thereby disabling said current limit circuit, and a supplemental current limit circuit coupled to said power source and to said reference frequency source, said supplemental current limit circuit being responsive to excessive currents from said power source to reduce said reference signal.

30. The arrangement recited in claim 29 wherein said fault correction circuit includes an OR circuit with one input coupled to each phase output of said frequency converter and third switch means coupled to the output of said OR circuit, and wherein said current limit control means includes a transistor having its base coupled to said power source and to said third switch means and its collector-emitter path coupled to each phase shift means to draw direct current therefrom, said third switch means being triggered on whenever the voltage of any phase output of said frequency converter falls below a predetermined value, the conduction of said third switch means overcoming the control of said transistor by said power source voltage and causing said transistor to be turned full on, whereby the firing wave is substantially retarded, said current limit circuit is disabled and said supplemental current limit controls the magnitude of said reference signal to regulate the output of said frequency converter whenever the power source current is excessive.

References Cited
UNITED STATES PATENTS

| | | | |
|---|---|---|---|
| 2,548,577 | 4/1951 | Alexanderson et al. | 321—13 |
| 3,330,998 | 7/1967 | Winograd | 315—194 X |
| 3,351,838 | 11/1967 | Hunter | 321—11 |

JOHN F. COUCH, *Primary Examiner.*

W. H. BEHA, JR., *Assistant Examiner.*

U.S. Cl. X.R.

321—5, 61